(12) United States Patent
Liu et al.

(10) Patent No.: US 10,901,976 B2
(45) Date of Patent: Jan. 26, 2021

(54) METHOD AND APPARATUS FOR DETERMINING SQL EXECUTION PLAN

(71) Applicant: Huawei Technologies Co., Ltd., Shenzhen (CN)

(72) Inventors: Huijun Liu, Xi'an (CN); Yang Ren, Xi'an (CN); Maozeng Li, Beijing (CN); Feng Han, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 15/495,569

(22) Filed: Apr. 24, 2017

(65) Prior Publication Data

US 2017/0242884 A1 Aug. 24, 2017

Related U.S. Application Data

(63) Continuation of application No. PCT/CN2016/090222, filed on Jul. 15, 2016.

(30) Foreign Application Priority Data

Feb. 19, 2016 (CN) .......................... 2016 1 0095091

(51) Int. Cl.
*G06F 17/00* (2019.01)
*G06F 7/00* (2006.01)
(Continued)

(52) U.S. Cl.
CPC ........ *G06F 16/235* (2019.01); *G06F 16/2246* (2019.01); *G06F 16/24542* (2019.01); *G06F 16/24545* (2019.01)

(58) Field of Classification Search
CPC .................................................. G06F 17/30365
(Continued)

(56) References Cited

U.S. PATENT DOCUMENTS 5,608,904 A 3/1997 Chaudhuri et al.
5,671,403 A * 9/1997 Shekita ............. G06F 17/30454
(Continued)

FOREIGN PATENT DOCUMENTS

CN 101576880 A 11/2009
CN 102053961 A 5/2011
(Continued)

OTHER PUBLICATIONS

Graefe et al., Dyanmic Query Evaluation Plans, ACM, published 1989.*

(Continued)

*Primary Examiner* — Pavan Mamillapalli
(74) *Attorney, Agent, or Firm* — Conley Rose, P.C.

(57) ABSTRACT

A method and an apparatus for determining a structured query language (SQL) execution plan are provided to optimize determining of the SQL execution plan and improve execution efficiency of the SQL execution plan. The SQL execution plan corresponds to at least one relation table. During an $N^{th}$ iteration, the method includes obtaining a first iteration parameter generated after a first plan tree is executed on the at least one relation table during an $(N-1)^{th}$ iteration, where N is a natural number greater than 1, establishing a second plan tree according to the first iteration parameter, and determining the first plan tree or the second plan tree as the SQL execution plan when a difference between the second plan tree and the first plan tree is not greater than a first threshold.

19 Claims, 8 Drawing Sheets

(51) Int. Cl.
*G06F 16/23* (2019.01)
*G06F 16/22* (2019.01)
*G06F 16/2453* (2019.01)

(58) Field of Classification Search
USPC .......................................................... 707/609
See application file for complete search history.

(56) References Cited

U.S. PATENT DOCUMENTS

| | | | | |
|---|---|---|---|---|
| 7,107,262 | B2* | 9/2006 | Dettinger | G06F 17/30395 |
| 7,383,287 | B2* | 6/2008 | Ellison | G06F 9/46 |
| | | | | 707/609 |
| 7,398,221 | B1* | 7/2008 | Bensoussan | G06Q 10/06 |
| | | | | 705/7.25 |
| 7,610,264 | B2* | 10/2009 | Ewen | G06F 17/30545 |
| 7,831,592 | B2* | 11/2010 | Markl | G06F 17/30457 |
| | | | | 707/718 |
| 7,877,373 | B2* | 1/2011 | Zait | G06F 16/24542 |
| | | | | 707/713 |
| 7,877,381 | B2* | 1/2011 | Ewen | G06F 17/30463 |
| | | | | 707/719 |
| 7,974,213 | B2* | 7/2011 | Sinha | H04L 41/0681 |
| | | | | 370/252 |
| 8,185,519 | B2* | 5/2012 | Chaudhuri | G06F 17/30463 |
| | | | | 707/714 |
| 8,311,863 | B1* | 11/2012 | Kemp | G06Q 10/0639 |
| | | | | 705/7.11 |
| 8,600,977 | B2* | 12/2013 | Dageville | G06F 16/24542 |
| | | | | 707/718 |
| 8,700,608 | B2* | 4/2014 | Belknap | G06F 17/30469 |
| | | | | 707/660 |
| 8,775,413 | B2* | 7/2014 | Brown | G06F 17/30474 |
| | | | | 707/713 |
| 8,843,474 | B2* | 9/2014 | Fiebig | G06F 16/8365 |
| | | | | 707/718 |
| 9,002,813 | B2* | 4/2015 | Gruschko | G06F 16/3344 |
| | | | | 707/705 |
| 2005/0120000 | A1* | 6/2005 | Ziauddin | G06F 17/30306 |
| 2005/0267866 | A1* | 12/2005 | Markl | G06F 17/30463 |
| 2006/0106839 | A1* | 5/2006 | Shen | G06F 17/30463 |
| 2006/0212429 | A1 | 9/2006 | Bruno et al. | |
| 2008/0177694 | A1* | 7/2008 | Chaudhuri | G06F 16/24542 |
| 2008/0201295 | A1* | 8/2008 | Praveena | G06F 16/24552 |
| 2009/0030888 | A1* | 1/2009 | Sahu | G06F 16/24542 |
| 2009/0327214 | A1 | 12/2009 | Richardson et al. | |
| 2010/0128629 | A1* | 5/2010 | Sinha | H04L 43/0882 |
| | | | | 370/253 |
| 2011/0060731 | A1* | 3/2011 | Al-Omari | G06F 16/24545 |
| | | | | 707/718 |
| 2011/0161310 | A1* | 6/2011 | Tang | G06F 16/24542 |
| | | | | 707/714 |
| 2012/0072413 | A1* | 3/2012 | Castellanos | G06F 16/24532 |
| | | | | 707/718 |
| 2013/0086039 | A1* | 4/2013 | Salch | G06F 21/6263 |
| | | | | 707/717 |
| 2013/0290973 | A1 | 10/2013 | Waas et al. | |
| 2014/0046928 | A1* | 2/2014 | Konik | G06F 16/24542 |
| | | | | 707/718 |
| 2014/0181078 | A1* | 6/2014 | Ghazal | G06F 17/30463 |
| | | | | 707/718 |
| 2014/0181079 | A1 | 6/2014 | Ghazal et al. | |
| 2014/0280020 | A1 | 9/2014 | Singamshetty et al. | |
| 2014/0280036 | A1* | 9/2014 | Korlapati | G06F 17/30463 |
| | | | | 707/718 |
| 2016/0234074 | A1* | 8/2016 | Prasetya | H04L 41/022 |
| 2016/0239556 | A1* | 8/2016 | Oh | G06F 11/1448 |
| 2016/0246842 | A1* | 8/2016 | Li | G06F 16/24532 |
| 2016/0253366 | A1* | 9/2016 | Hsu | G06K 9/00496 |
| | | | | 707/797 |
| 2016/0259824 | A1* | 9/2016 | Livshits | G06F 16/24542 |
| 2016/0275176 | A1* | 9/2016 | Shapiro | G06F 3/04842 |
| 2016/0292167 | A1* | 10/2016 | Tran | G06F 16/24542 |
| 2016/0292225 | A1* | 10/2016 | Konik | G06F 16/25 |
| 2016/0292226 | A1* | 10/2016 | Konik | G06F 16/24542 |
| 2017/0124151 | A1* | 5/2017 | Ji | G06F 17/30463 |

FOREIGN PATENT DOCUMENTS

| | | |
|---|---|---|
| CN | 102262636 A | 11/2011 |
| CN | 103092970 A | 5/2013 |
| CN | 103761080 A | 4/2014 |
| CN | 103793467 A | 5/2014 |
| CN | 103984726 A | 8/2014 |
| CN | 105243068 A | 1/2016 |
| JP | H05334368 A | 12/1993 |
| JP | H08255177 A | 10/1996 |
| JP | 2001142898 A | 5/2001 |
| JP | 2005018430 A | 1/2005 |
| JP | 2007293723 A | 11/2007 |
| RU | 2409848 C2 | 1/2011 |

OTHER PUBLICATIONS

Foreign Communication From a Counterpart Application, PCT Application No. PCT/CN2016/090222, International Search Report dated Oct. 26, 2016, 5 pages.
Stillger, M., et al., "LEO—DB2"s Learning Optimizer," XP055443190, Proceedings of the 27th VLDB Conference, 2001, 10 pages.
Yu, F., et al., "Join Selectivity Re-estimation for Repetitive Queries in Databases," XP047374806, Network and Parallel Computing, vol. 6861, Aug. 29, 2011, 8 pages.
Foreign Communication From a Counterpart Application, European Application No. 16840285.7, Extended European Search Report dated Feb. 5, 2018, 12 pages.
Machine Translation and Abstract of Japanese Publication No. JP2001142898, May 25, 2001, 18 pages.
Machine Translation and Abstract of Japanese Publication No. JP2005018430, Jan. 20, 2005, 9 pages.
Machine Translation and Abstract of Japanese Publication No. JP2007293723, Nov. 8, 2007, 8 pages.
Machine Translation and Abstract of Japanese Publication No. JPH05334368, Dec. 17, 1993, 8 pages.
Foreign Communication From a Counterpart Application, Japanese Application No. 2017-518519, Japanese Office Action dated May 28, 2018, 4 pages.
Foreign Communication From a Counterpart Application, Japanese Application No. 2017-518519, English Translation of Japanese Office Action dated May 28, 2018, 4 pages.
Machine Translation and Abstract of Chinese Publication No. CN102053961, May 11, 2011, 23 pages.
Machine Translation and Abstract of Chinese Publication No. CN103092970, May 8, 2013, 21 pages.
Machine Translation and Abstract of Chinese Publication No. CN103761080, Apr. 30, 2014, 15 pages.
Machine Translation and Abstract of Chinese Publication No. CN103984726, Aug. 13, 2014, 15 pages.
Machine Translation and Abstract of Russian Publication No. RU2409848, Jan. 20, 2011, 28 pages.
Foreign Communication From a Counterpart, Russian Application No. 2017113685, Russian Search Report dated Jul. 2, 2018, 2 pages.
Foreign Communication From a Counterpart, Russian Application No. 2017113685, English Translation of Russian Search Report dated Jul. 2, 2018, 2 pages.
Foreign Communication From a Counterpart Application, Korean Application No. 2017113685, Korean Office Action dated Jul. 3, 2018, 6 pages.
Foreign Communication From a Counterpart Application, Korean Application No. 2017113685, English Translation of Korean Office Action dated Jul. 3, 2018, 6 pages.
Machine Translation and Abstract of Chinese Publication No. CN102262636, Nov. 30, 2011, 17 pages.
Machine Translation and Abstract of Chinese Publication No. CN105243068, Jan. 13, 2016, 24 pages.

(56) References Cited

OTHER PUBLICATIONS

Foreign Communication From a Counterpart Application, Chinese Application No. 201610095091.0, Chinese Office Action dated Apr. 19, 2019, 5 pages.

* cited by examiner

METHOD AND APPARATUS FOR DETERMINING SQL EXECUTION PLAN

CROSS-REFERENCE TO RELATED APPLICATIONS

This application is a continuation of International Patent Application No. PCT/CN2016/090222 filed on Jul. 15, 2016, which claims priority to Chinese Patent Application No. 201610095091.0 filed on Feb. 19, 2016. Both of the afore-mentioned patent applications are hereby incorporated by reference in their entireties.

TECHNICAL FIELD

The present application relates to the field of computer technologies, and in particular, to a method and an apparatus for determining a Structured Query Language (SQL) execution plan.

BACKGROUND

To execute an SQL statement generally needs three phases, a lexical and syntactical analysis phase, a phase for determining an SQL execution plan, and a phase for executing an SQL execution plan.

Further, an SQL statement refers to a result wanted by a user. For example, the SQL statement may be querying all clients living in Beijing. However, the SQL statement does not tell a server how to execute the SQL statement. After the server receives a Query command, and after it is determined in the lexical and syntactical analysis phase that the Query command is syntactically correct, a Parse Tree is formed. The server searches a database of the server for related statistical information that is already collected, and determines a preferred SQL execution plan for the SQL statement with reference to the Parse Tree. The SQL execution plan may be obtained in a manner of a plan tree. Nodes on the plan tree include multiple basic operations, for example, basic operations such as traversing multiple tables and performing a nested connection or a Hash connection. Finally, the server executes the SQL execution plan according to the obtained plan tree, and an output result is a result represented by the SQL statement.

It can be learned that execution efficiency of an SQL statement depends, to some extent, on whether an efficient SQL execution plan can be determined. However, statistical information in a database is generally an eigenvalue obtained based on a sampling value, for example, eigenvalues such as a relation tuple in a relation table and a quantity of unique distinct values in a field in a relation table. An error generally exists in these eigenvalues obtained by means of sampling, and hysteresis exists in terms of time. Therefore, an SQL execution plan determined by a server on a basis of the foregoing statistical information is generally not an optimal execution plan.

SUMMARY

Embodiments of the present application provide a method and an apparatus for determining an SQL execution plan in order to optimize determining of the SQL execution plan and improve execution efficiency of the SQL execution plan.

To achieve the foregoing objective, the following technical solutions are used in the embodiments of the present application.

A first aspect of the embodiments of the present application provides a method for determining an SQL execution plan, where the SQL execution plan corresponds to at least one relation table, and during an $N^{th}$ iteration, the method includes obtaining a first iteration parameter generated after a first plan tree is executed on the at least one relation table during an $(N-1)^{th}$ iteration, where N is a natural number greater than 1, establishing a second plan tree according to the first iteration parameter, and determining the first plan tree or the second plan tree as the SQL execution plan when a difference between the second plan tree and the first plan tree is not greater than a first threshold.

With reference to the first aspect, in a first possible implementation manner of the first aspect, the threshold is 0, and correspondingly, determining the first plan tree or the second plan tree as the SQL execution plan when a difference between the second plan tree and the first plan tree is not greater than a first threshold includes determining the first plan tree or the second plan tree as the SQL execution plan when the second plan tree is the same as the first plan tree.

A beneficial effect obtained by implementing the embodiments of the present application is that, in the embodiments of the present application, an optimized SQL execution plan is obtained by means of iteration execution. During each iteration process, a plan tree (referred to as a first plan tree in the embodiments of the present application) established during a previous iteration process needs to be compared with a plan tree (referred to as a second plan tree in the embodiments of the present application) established during a current iteration process. In addition, the second plan tree is established according to an iteration parameter (referred to as a first iteration parameter in the embodiments of the present application) updated during the previous iteration process, that is, a second plan tree established during each iteration process is established based on the first iteration parameter updated by executing the first plan tree. Therefore, after iterations are performed for multiple times, a finally obtained plan tree does not depend on an estimation iteration parameter already collected in a database, but the plan tree is established according to an iteration parameter recorded each time the plan tree is actually executed during the iteration process in order to obtain a relatively accurate SQL execution plan for an SQL statement, and improve execution efficiency of the SQL execution plan.

With reference to the first aspect, or the first possible implementation manner of the first aspect, in a second possible implementation manner of the first aspect, the first iteration parameter includes relation tuples in any one or more relation tables corresponding to the SQL execution plan.

With reference to the first aspect, or the first to the second possible implementation manners of the first aspect, in a third possible implementation manner of the first aspect, when the SQL execution plan corresponds to at least two relation tables, the first iteration parameter further includes relation tuples in a result set that is obtained after a join operation is performed on any one or more relation tables in the at least two relation tables.

With reference to the first aspect, or the first to the third possible implementation manners of the first aspect, in a fourth possible implementation manner of the first aspect, after determining the first plan tree or the second plan tree as the SQL execution plan, the method further includes recording a state of the SQL execution plan as a determined state.

With reference to any one of the first aspect, or the first to the fourth possible implementation manners of the first aspect, in a fifth possible implementation manner of the first aspect, after establishing a second plan tree according to the first iteration parameter, the method further includes executing the second plan tree, and recording a second iteration parameter generated when the second plan tree is executed.

A beneficial effect obtained by implementing the embodiments of the present application is that, because the updated first iteration parameter is obtained when the second plan tree is actually executed, a second plan tree established using the updated first iteration parameter is more accurate.

With reference to the fifth possible implementation manner of the first aspect, in a sixth possible implementation manner of the first aspect, the second iteration parameter includes relation tuples in any one or more relation tables corresponding to the SQL execution plan.

With reference to the fifth or the sixth possible implementation manner of the first aspect, in a seventh possible implementation manner of the first aspect, when the SQL execution plan corresponds to at least two relation tables, the second iteration parameter further includes relation tuples in a result set that is obtained after a join operation is performed on any one or more relation tables in the at least two relation tables.

With reference to any one of the fifth to the seventh possible implementation manners of the first aspect, in an eighth possible implementation manner of the first aspect, the method further includes updating the first iteration parameter according to the second iteration parameter when the difference between the second plan tree and the first plan tree is greater than the first threshold, and setting the second plan tree during the $N^{th}$ iteration as a first plan tree during an $(N+1)^{th}$ iteration.

With reference to the eighth possible implementation manner of the first aspect, in a ninth possible implementation manner of the first aspect, before updating the first iteration parameter according to the second iteration parameter, the method further includes establishing a second plan tree different from the first plan tree according to the first iteration parameter when the second iteration parameter is the same as the first iteration parameter.

With reference to the ninth possible implementation manner of the first aspect, in a tenth possible implementation manner of the first aspect, after establishing a second plan tree different from the first plan tree according to the first iteration parameter, the method further includes recording an execution time for executing the second plan tree, and setting the second plan tree with the shortest execution time during all N iterations as the SQL execution plan when N is greater than a second threshold.

With reference to the tenth possible implementation manner of the first aspect, in an eleventh possible implementation manner of the first aspect, after setting the second plan tree with the shortest execution time during all N iterations as the SQL execution plan, the method further includes recording a state of the SQL execution plan as a determined state.

With reference to the eighth possible implementation manner of the first aspect, in a twelfth possible implementation manner of the first aspect, before updating the first iteration parameter according to the second iteration parameter, the method further includes recording an execution time for executing the second plan tree, and setting the second plan tree with the shortest execution time during all N iterations as the SQL execution plan when N is greater than a third threshold.

With reference to the twelfth possible implementation manner of the first aspect, in a thirteenth possible implementation manner of the first aspect, after setting the second plan tree with the shortest execution time during all N iterations as the SQL execution plan, the method further includes recording a state of the SQL execution plan as a determined state.

A beneficial effect obtained by implementing the embodiments of the present application is that, for SQL execution plans on which a variation is already performed during iteration processes, a plan tree that is the same as a plan tree obtained during a previous iteration may never be obtained by means of iteration. Therefore, to avoid an infinite loop, it can be considered that when a quantity N of iterations is greater than a threshold, during passed N iteration processes, a second plan tree with the shortest execution time is an optimal plan tree, and then the second plan tree is set as the SQL execution plan.

With reference to any one of the seventh to the thirteenth possible implementation manners of the first aspect, in a fourteenth possible implementation manner of the first aspect, updating the first iteration parameter according to the second iteration parameter includes obtaining a union set of the second iteration parameter and the first iteration parameter, and setting a result of the union set as the first iteration parameter.

With reference to any one of the first aspect, or the first to the fourteenth possible implementation manners of the first aspect, in a fifteenth possible implementation manner of the first aspect, the method further includes establishing an initial plan tree according to a pre-stored estimation iteration parameter when an initial iteration is performed, executing the initial plan tree to obtain an initial iteration parameter, and updating the estimation iteration parameter according to the initial iteration parameter to obtain the first iteration parameter.

With reference to the fifteenth possible implementation manner of the first aspect, in a sixteenth possible implementation manner of the first aspect, the estimation iteration parameter includes relation tuples in any one or more relation tables corresponding to the SQL execution plan.

With reference to the fifteenth or the sixteenth possible implementation manner of the first aspect, in a seventeenth possible implementation manner of the first aspect, the initial iteration parameter includes relation tuples in any one or more relation tables corresponding to the SQL execution plan.

With reference to any one of the fifteenth to the seventeenth possible implementation manners of the first aspect, in an eighteenth possible implementation manner of the first aspect, when the SQL execution plan corresponds to at least two relation tables, the initial iteration parameter further includes relation tuples in a result set that is obtained after a join operation is performed on any one or more relation tables in the at least two relation tables.

With reference to any one of the fifteenth to the eighteenth possible implementation manners of the first aspect, in a nineteenth possible implementation manner of the first aspect, updating the estimation iteration parameter according to the initial iteration parameter to obtain the first iteration parameter includes obtaining a union set of the initial iteration parameter and the estimation iteration parameter, and setting a result of the union set as the first iteration parameter.

With reference to any one of the fifteenth to the nineteenth possible implementation manners of the first aspect, in a twentieth possible implementation manner of the first aspect, before the initial iteration is performed, the method further includes querying whether the state of the SQL execution plan is the determined state, and executing the SQL execution plan when the state of the SQL execution plan is the determined state.

A beneficial effect obtained by implementing this embodiment of the present application is that, the SQL execution plan does not need to be determined repeatedly, thereby improving execution efficiency of a server when needing to be re-executed after an optimized SQL execution plan is already stored in the server.

With reference to any one of the first aspect, or the second to the twentieth possible implementation manners of the first aspect, in a twenty-first possible implementation manner of the first aspect, the SQL execution plan further includes a filter criterion, and when the SQL execution plan further includes the filter criterion, the first iteration parameter includes relation tuples, which conform to the filter condition, in any one or more relation tables corresponding to the SQL execution plan.

With reference to any one of the first aspect, or the second to the twenty-first possible implementation manners of the first aspect, in a twenty-second possible implementation manner of the first aspect, the first iteration parameter further includes a quantity of unique distinct values in a field in any relation table corresponding to the SQL execution plan, and/or a set of a column whose quantity of occurrences in the relation table exceeds a second threshold, which is called as most common value (MCV).

A beneficial effect obtained by implementing the embodiments of the present application includes that a second plan tree obtained in the embodiments of the present application does not depend on an estimation iteration parameter already collected in a database, but is established according to a first iteration parameter updated during an iteration process. Further, the second plan tree is set as an SQL execution plan when a second plan tree is the same as a first plan tree such that a relatively accurate SQL execution plan can be determined, thereby improving execution efficiency of the SQL execution plan.

A second aspect of the embodiments of the present application provides an apparatus for determining an SQL execution plan, where the SQL execution plan corresponds to at least one relation table, the apparatus includes a memory and a processor coupled to the memory, and during an $N^{th}$ iteration, the processor is configured to obtain a first iteration parameter generated after a first plan tree is executed on the at least one relation table during an $(N-1)^{th}$ iteration, where N is a natural number greater than 1, establish a second plan tree according to the first iteration parameter, and determine the first plan tree or the second plan tree as the SQL execution plan when a difference between the second plan tree and the first plan tree is not greater than a first threshold.

With reference to the second aspect, in a first possible implementation manner of the second aspect, the first threshold is 0, and correspondingly, the processor is configured to determine the first plan tree or the second plan tree as the SQL execution plan when the second plan tree is the same as the first plan tree.

With reference to the second aspect, or the first possible implementation manner of the second aspect, in a second possible implementation manner of the second aspect, the first iteration parameter includes relation tuples in any one or more relation tables corresponding to the SQL execution plan.

With reference to the second aspect, or the first to the second possible implementation manners of the second aspect, in a third possible implementation manner of the second aspect, when the SQL execution plan corresponds to at least two relation tables, the first iteration parameter further includes relation tuples in a result set obtained after a join operation is performed on any one or more relation tables in the at least two relation tables.

With reference to the second aspect, or the first to the third possible implementation manners of the second aspect, in a fourth possible implementation manner of the second aspect, after determining the first plan tree or the second plan tree as the SQL execution plan, the processor is further configured to record a state of the SQL execution plan as a determined state.

With reference to any one of the second aspect, or the first to the fourth possible implementation manners of the second aspect, in a fifth possible implementation manner of the second aspect, after establishing the second plan tree according to the first iteration parameter, the processor is further configured to execute the second plan tree, and record a second iteration parameter generated when the second plan tree is executed.

With reference to the fifth possible implementation manner of the second aspect, in a sixth possible implementation manner of the second aspect, the second iteration parameter includes relation tuples in any one or more relation tables corresponding to the SQL execution plan.

With reference to the fifth or the sixth possible implementation manner of the second aspect, in a seventh possible implementation manner of the second aspect, when the SQL execution plan corresponds to at least two relation tables, the second iteration parameter further includes relation tuples in a result set that is obtained after a join operation is performed on any one or more relation tables in the at least two relation tables.

With reference to any one of the fifth to the seventh possible implementation manners of the second aspect, in an eighth possible implementation manner of the second aspect, the processor is further configured to update the first iteration parameter according to the second iteration parameter when the difference between the second plan tree and the first plan tree is greater than the first threshold, and set the second plan tree during the $N^{th}$ iteration as a first plan tree during an $(N+1)^{th}$ iteration.

With reference to the eighth possible implementation manner of the second aspect, in a ninth possible implementation manner of the second aspect, before updating the first iteration parameter according to the second iteration parameter, the processor is further configured to establish a second plan tree different from the first plan tree according to the first iteration parameter when the second iteration parameter is the same as the first iteration parameter.

With reference to the ninth possible implementation manner of the second aspect, in a tenth possible implementation manner of the second aspect, after establishing the second plan tree different from the first plan tree according to the first iteration parameter, the processor is further configured to record an execution time for executing the second plan tree, and set the second plan tree with the shortest execution time during all N iterations as the SQL execution plan when N is greater than a second threshold.

With reference to the tenth possible implementation manner of the second aspect, in an eleventh possible implementation manner of the second aspect, after setting the second plan tree with the shortest execution time during all N iterations as the SQL execution plan, the processor is further configured to record a state of the SQL execution plan as a determined state.

With reference to the eighth possible implementation manner of the second aspect, in a twelfth possible implementation manner of the second aspect, before updating the first iteration parameter according to the second iteration parameter, the processor is further configured to record an execution time for executing the second plan tree, and set the second plan tree with the shortest execution time during all N iterations as the SQL execution plan when N is greater than a third threshold.

With reference to the twelfth possible implementation manner of the second aspect, in a thirteenth possible implementation manner of the second aspect, after setting the second plan tree with the shortest execution time during all N iterations as the SQL execution plan, the processor is further configured to record a state of the SQL execution plan as a determined state.

With reference to any one of the seventh to the thirteenth possible implementation manners of the second aspect, in a fourteenth possible implementation manner of the second aspect, the processor is further configured to obtain a union set of the second iteration parameter and the first iteration parameter, and set a result of the union set as the first iteration parameter.

With reference to any one of the second aspect, or the first to the fourteenth possible implementation manners of the second aspect, in a fifteenth possible implementation manner of the second aspect, the processor is further configured to establish an initial plan tree according to a pre-stored estimation iteration parameter when an initial iteration is performed, execute the initial plan tree to obtain an initial iteration parameter, and update the estimation iteration parameter according to the initial iteration parameter to obtain the first iteration parameter.

With reference to the fifteenth possible implementation manner of the second aspect, in a sixteenth possible implementation manner of the second aspect, the estimation iteration parameter includes relation tuples in any one or more relation tables corresponding to the SQL execution plan.

With reference to the fifteenth or the sixteenth possible implementation manner of the second aspect, in a seventeenth possible implementation manner of the second aspect, the initial iteration parameter includes relation tuples in any one or more relation tables corresponding to the SQL execution plan.

With reference to any one of the fifteenth to the seventeenth possible implementation manners of the second aspect, in an eighteenth possible implementation manner of the second aspect, when the SQL execution plan corresponds to at least two relation tables, the initial iteration parameter further includes relation tuples in a result set that is obtained after a join operation is performed on any one or more relation tables in the at least two relation tables.

With reference to any one of the fifteenth to the eighteenth possible implementation manners of the second aspect, in a nineteenth possible implementation manner of the second aspect, the processor is further configured to obtain a union set of the initial iteration parameter and the estimation iteration parameter, and set a result of the union set as the first iteration parameter.

With reference to any one of the fifteenth to the nineteenth possible implementation manners of the second aspect, in a twentieth possible implementation manner of the second aspect, before the initial iteration is performed, the processor is further configured to query whether the state of the SQL execution plan is the determined state, and execute the SQL execution plan when the state of the SQL execution plan is the determined state.

With reference to any one of the second aspect, or the second to the twentieth possible implementation manners of the second aspect, in a twenty-first possible implementation manner of the second aspect, the SQL execution plan further includes a filter criterion, and when the SQL execution plan further includes the filter criterion, the first iteration parameter includes relation tuples, which conform to the filter condition, in any one or more relation tables corresponding to the SQL execution plan.

With reference to any one of the second aspect, or the second to the twenty-first possible implementation manners of the second aspect, in a twenty-second possible implementation manner of the second aspect, the first iteration parameter further includes a quantity of unique distinct values in a field in any relation table corresponding to the SQL execution plan, and/or a set (MCV) of a column whose quantity of occurrences in the relation table exceeds a second threshold.

A third aspect of the embodiments of the present application provides an apparatus for determining an SQL execution plan, the SQL execution plan corresponds to at least one relation table, the apparatus includes an obtaining unit, an establishment unit, and a determining unit, and during an $N^{th}$ iteration, the obtaining unit is configured to obtain a first iteration parameter generated after a first plan tree is executed on the at least one relation table during an $(N-1)^{th}$ iteration, where N is a natural number greater than 1. The establishment unit is configured to establish a second plan tree according to the first iteration parameter, and the determining unit is configured to determine the first plan tree or the second plan tree as the SQL execution plan when a difference between the second plan tree and the first plan tree is not greater than a first threshold.

With reference to the third aspect, in a first possible implementation manner of the third aspect, the first threshold is 0, and correspondingly, the determining unit is further configured to determine the first plan tree or the second plan tree as the SQL execution plan when the second plan tree is the same as the first plan tree.

With reference to the third aspect, or the first possible implementation manner of the third aspect, in a second possible implementation manner of the third aspect, the first iteration parameter includes relation tuples in any one or more relation tables corresponding to the SQL execution plan.

With reference to the third aspect, or the first to the second possible implementation manners of the third aspect, in a third possible implementation manner of the third aspect, when the SQL execution plan corresponds to at least two relation tables, the first iteration parameter further includes relation tuples in a result set that is obtained after a join operation is performed on any one or more relation tables in the at least two relation tables.

With reference to the third aspect, or the first to the third possible implementation manners of the third aspect, in a fourth possible implementation manner of the third aspect, after determining the first plan tree or the second plan tree as the SQL execution plan, the apparatus further includes a recording unit configured to record a state of the SQL execution plan as a determined state.

With reference to any one of the third aspect, or the first to the fourth possible implementation manners of the third aspect, in a fifth possible implementation manner of the third aspect, after establishing the second plan tree according to the first iteration parameter, the apparatus further includes an execution unit configured to execute the second plan tree, and the recording unit is further configured to record a second iteration parameter generated when the second plan tree is executed.

With reference to the fifth possible implementation manner of the third aspect, in a sixth possible implementation manner of the third aspect, the second iteration parameter includes relation tuples in any one or more relation tables corresponding to the SQL execution plan.

With reference to the fifth or the sixth possible implementation manner of the third aspect, in a seventh possible implementation manner of the third aspect, when the SQL execution plan corresponds to at least two relation tables, the second iteration parameter further includes relation tuples in a result set that is obtained after a join operation is performed on any one or more relation tables in the at least two relation tables.

With reference to any one of the fifth to the seventh possible implementation manners of the third aspect, in an eighth possible implementation manner of the third aspect, the apparatus further includes an update unit configured to update the first iteration parameter according to the second iteration parameter when the difference between the second plan tree and the first plan tree is greater than the first threshold, and set the second plan tree during the $N^{th}$ iteration as a first plan tree during an $(N+1)^{th}$ iteration.

With reference to the eighth possible implementation manner of the third aspect, in a ninth possible implementation manner of the third aspect, before the first iteration parameter is updated according to the second iteration parameter, the establishment unit is further configured to establish a second plan tree different from the first plan tree according to the first iteration parameter when the second iteration parameter is the same as the first iteration parameter.

With reference to the ninth possible implementation manner of the third aspect, in a tenth possible implementation manner of the third aspect, after a second plan tree different from the first plan tree is established according to the first iteration parameter, the recording unit is further configured to record an execution time for executing the second plan tree, and the determining unit is further configured to set the second plan tree with the shortest execution time during all N iterations as the SQL execution plan when N is greater than a second threshold.

With reference to the tenth possible implementation manner of the third aspect, in an eleventh possible implementation manner of the third aspect, after the second plan tree with the shortest execution time during all N iterations is set as the SQL execution plan, the recording unit is further configured to record a state of the SQL execution plan as a determined state.

With reference to the eighth possible implementation manner of the third aspect, in a twelfth possible implementation manner of the third aspect, before the first iteration parameter is updated according to the second iteration parameter, the recording unit is further configured to record an execution time for executing the second plan tree, and the determining unit is further configured to set the second plan tree with the shortest execution time during all N iterations as the SQL execution plan when N is greater than a third threshold.

With reference to the twelfth possible implementation manner of the third aspect, in a thirteenth possible implementation manner of the third aspect, after the second plan tree with the shortest execution time during all N iterations is set as the SQL execution plan, the recording unit is further configured to record a state of the SQL execution plan as a determined state.

With reference to any one of the seventh to the thirteenth possible implementation manners of the third aspect, in a fourteenth possible implementation manner of the third aspect, the update unit is further configured to obtain a union set of the second iteration parameter and the first iteration parameter, and set a result of the union set as the first iteration parameter.

With reference to any one of the third aspect, or the first to the fourteenth possible implementation manners of the third aspect, in a fifteenth possible implementation manner of the third aspect, the establishment unit is further configured to establish an initial plan tree according to a pre-stored estimation iteration parameter when an initial iteration is performed. The execution unit is further configured to execute the initial plan tree to obtain an initial iteration parameter, and the update unit is further configured to update the estimation iteration parameter according to the initial iteration parameter to obtain the first iteration parameter.

With reference to the fifteenth possible implementation manner of the third aspect, in a sixteenth possible implementation manner of the third aspect, the estimation iteration parameter includes relation tuples in any one or more relation tables corresponding to the SQL execution plan.

With reference to the fifteenth or the sixteenth possible implementation manner of the third aspect, in a seventeenth possible implementation manner of the third aspect, the initial iteration parameter includes relation tuples in any one or more relation tables corresponding to the SQL execution plan.

With reference to any one of the fifteenth to the seventeenth possible implementation manners of the third aspect, in an eighteenth possible implementation manner of the third aspect, when the SQL execution plan corresponds to at least two relation tables, the initial iteration parameter further includes relation tuples in a result set that is obtained after a join operation is performed on any one or more relation tables in the at least two relation tables.

With reference to any one of the fifteenth to the eighteenth possible implementation manners of the third aspect, in a nineteenth possible implementation manner of the third aspect, the update unit is further configured to obtain a union set of the initial iteration parameter and the estimation iteration parameter, and set a result of the union set as the first iteration parameter.

With reference to any one of the fifteenth to the nineteenth possible implementation manners of the third aspect, in a twentieth possible implementation manner of the third aspect, before the initial iteration is performed, the apparatus further includes a query unit configured to query whether the state of the SQL execution plan is the determined state, and the determining unit is further configured to execute the SQL execution plan when the state of the SQL execution plan is the determined state.

With reference to any one of the third aspect, or the second to the twentieth possible implementation manner of the third aspect, in a twenty-first possible implementation manner of the third aspect, the SQL execution plan further includes a filter criterion, and when the SQL execution plan further includes the filter criterion, the first iteration parameter includes relation tuples, which conform to the filter condition, in any one or more relation tables corresponding to the SQL execution plan.

With reference to any one of the third aspect, or the second to the twenty-first possible implementation manners of the third aspect, in a twenty-second possible implementation manner of the third aspect, the first iteration parameter further includes a quantity of unique distinct values in a field in any relation table corresponding to the SQL execution plan, and/or a set (MCV) of a column whose quantity of occurrences in the relation table exceeds a second threshold.

According to a fourth aspect, an apparatus for determining an SQL execution plan is provided, including a processor, a memory, a bus, and a communications interface, where the memory is configured to store a computer execution instruction. The processor is connected to the memory using the bus, and when the determining apparatus runs, the processor executes the computer execution instruction stored in the memory such that the determining apparatus performs the method for determining an SQL execution plan according to any one of the first aspect or the first to the twenty-second possible implementation manners of the first aspect in the embodiments of the present application.

According to a fifth aspect, a computer storage medium is provided configured to store a computer software instruction used by the apparatus for determining an SQL execution plan according to the fourth aspect, and the computer storage medium includes a program designed for executing the apparatus for determining an SQL execution plan in the fourth aspect.

In the present application, a name of an apparatus for determining an SQL execution plan does not impose limitation on a device. In an actual implementation, the device may appear with another name. If functions of a device are similar to the functions of the device in the present application, the device shall fall within a scope of claims of the present application and technologies equivalent to the present application.

In addition, for a technical effect brought by any one of the implementation manners in the second aspect to the fifth aspect, refer to the technical effects brought by different possible implementation manners in the first aspect. Details are not described herein again.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

Figure 1:
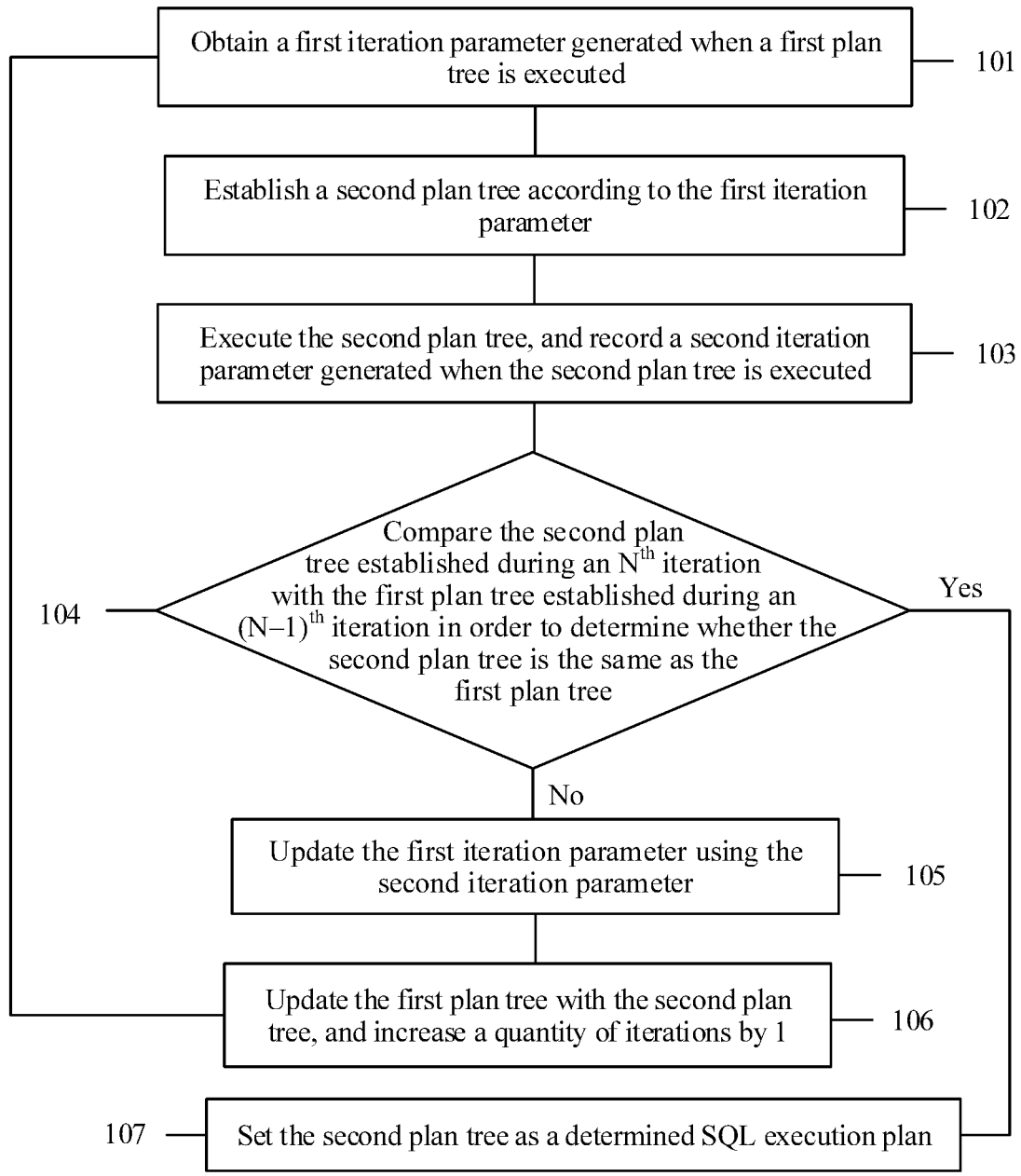
FIG. 1 is a schematic flowchart of a method for determining an SQL execution plan according to an embodiment of the present application.

The following clearly describes the technical solutions in the embodiments of the present application with reference to the accompanying drawings in the embodiments of the present application. The described embodiments are merely some but not all of the embodiments of the present application.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features. In the description of the present application, "multiple" means two or more than two, unless otherwise specified.

A method for determining an SQL execution plan that is provided in the embodiments of the present application may be applied in a phase for determining the SQL execution plan. A core principle of the solution is as follows. Setting an iteration method to establish a plan tree based on an iteration parameter generated each time a plan tree is actually executed in order to obtain an optimal SQL execution plan.

Further, in other approaches, a server receives an SQL statement. Generally, when an SQL execution plan is determined, a plan tree is directly established according to an estimation iteration parameter (that is, an eigenvalue obtained using a sampling method or an iteration method) that is pre-stored in a database of the server, and the plan tree is used as an SQL execution plan. However, because the estimation iteration parameter may be inaccurate, the determined SQL execution plan may be inaccurate.

Therefore, in the method for determining an SQL execution plan that is provided in the embodiments of the present application, a plan tree may be cyclically established and executed using an iteration method, and iteration parameters generated during actual plan tree execution processes are recorded in order to update an eigenvalue obtained using a sampling method or an estimation method in a previous iteration process. Further, in a next iteration process, a plan tree is re-established using the updated iteration parameter until plan trees established in two adjacent iteration processes are the same, and the plan tree is used as the SQL execution plan.

During each iteration process, a plan tree (referred to as a first plan tree in the embodiments of the present application) established during a previous iteration process needs to be compared with a plan tree (referred to as a second plan tree in the embodiments of the present application) established during a current iteration process. In addition, the second plan tree is established according to an iteration parameter (referred to as a first iteration parameter in the embodiments of the present application) updated during the previous iteration process, that is, a second plan tree established during each iteration process is established based on the first iteration parameter updated by executing the first plan tree. Therefore, after iterations are performed for multiple times, a finally obtained plan tree does not depend on an estimation iteration parameter already collected in a database, but the plan tree is established according to an iteration parameter recorded each time the plan tree is actually executed during the iteration process in order to obtain a relatively accurate SQL execution plan, and improve execution efficiency of the SQL execution plan.

To describe in detail the method for determining an SQL execution plan that is provided in the embodiments of the present application, the following explains some professional terms that may be involved in the embodiments of the present application.

First, for a clear description of the iteration process involved in the embodiments of the present application, it is assumed that a previous iteration is an $(N-1)^{th}$ iteration, and a current iteration is an $N^{th}$ iteration. Then, a plan tree established during the $(N-1)^{th}$ iteration is a first plan tree, and a plan tree established during the $N^{th}$ iteration is a second plan tree, where N is a natural number greater than 1.

The SQL execution plan corresponds to at least one relation table in the database. It is assumed that the SQL execution plan corresponds to M relation tables, where M is a natural number greater than 1.

It is assumed that the first iteration parameter may include a first eigenvalue and/or a second eigenvalue, that is, at least one of the first eigenvalue or the second eigenvalue. The first eigenvalue indicates relation tuples in any one or more relation tables corresponding to an SQL execution plan, and the second eigenvalue indicates relation tuples in a result set obtained by performing a join operation on any one or more relation tables in the at least two relation tables when the SQL execution plan corresponds to at least two relation tables. In the embodiments of the present application, the first eigenvalue is represented by $N_{(i)}$, and the second eigenvalue is represented by $N_{(i,j,k)}$. $N_{(i)}$ is a relation tuple of an $i^{th}$ relation table, and $N_{(i,j,k)}$ is a relation tuple of a result set obtained after a join operation is performed in a sequence of an $i^{th}$ relation table, a $i^{th}$ relation table, and a $k^{th}$ relation table.

Execution of the SQL execution plan by the server may further include determining a filter criterion of the SQL execution plan. For example, the filter criterion is to count all boys taller than 180 centimeters. In this case, the first eigenvalue may be further used to indicate a relation tuple, which meets the filter criterion, in the $i^{th}$ relation table.

Similarly, the second iteration parameter involved in the embodiments of the present application also includes a first eigenvalue and/or a second eigenvalue. A difference is that the first iteration parameter refers to an iteration parameter updated during an $(N-1)^{th}$ iteration, and the second iteration parameter refers to an iteration parameter generated when a second plan tree is executed during an $N^{th}$ iteration. A manner of updating the first iteration parameter is described in detail in the embodiments of the present application.

The eigenvalue may further include a quantity of unique distinct values in a field in the relation table, and/or a set (MCV) of a column whose quantity of occurrences in the relation table exceeds a second threshold.

In the embodiments of the present application, further, if a second plan tree established during an $N^{th}$ iteration is different from a first plan tree established during an $(N-1)^{th}$ iteration, but a second iteration parameter generated when the second plan tree is executed is the same as a first iteration parameter generated when the first plan tree is executed, it is considered that a variation needs to be performed on a current SQL execution plan such that a better SQL execution plan can be further obtained.

As shown in FIG. 1, an embodiment of the present application provides a method for determining an SQL execution plan. Because during an iteration process, the second to the last iteration processes are the same, an $N^{th}$ iteration process is used herein as an example for illustration purposes. The method includes the following steps.

Step 101: Obtain a first iteration parameter generated when a first plan tree is executed.

Because both a plan tree established during an iteration process and a first iteration parameter generated at the end of the iteration process can be saved, during an $N^{th}$ iteration process, a first plan tree established during an $(N-1)^{th}$ iteration and the foregoing first iteration parameter can be obtained.

Step 102: Establish a second plan tree according to the first iteration parameter.

For example, when N=2, a second plan tree can be established according to a first iteration parameter obtained when a first iteration is completed.

Step 103: Execute the second plan tree, and record a second iteration parameter generated when the second plan tree is executed.

Further, in step 103, the second plan tree established in step 102 is executed, and a second iteration parameter generated when the second plan tree is executed is recorded.

Similarly, the second iteration parameter also includes $N_{(i)}$ and/or $N_{(i,j,k)}$.

Step 104: Compare the second plan tree established during an $N^{th}$ iteration with the first plan tree established during an $(N-1)^{th}$ iteration in order to determine whether the second plan tree is the same as the first plan tree.

It should be noted that, the foregoing $(N-1)^{th}$ iteration is an initial plan tree established during the first iteration when N=2.

It should be understood that, for example, in step 104, the second plan tree established during the $N^{th}$ iteration is compared with the first plan tree established during the $(N-1)^{th}$ iteration in order to determine whether the second plan tree is the same as the first plan tree. In some embodiments, step 104 further includes comparing the second plan tree established during the $N^{th}$ iteration and the first plan tree established during the $(N-1)^{th}$ iteration with a threshold in order to determine whether a difference between the second plan tree and the first plan tree is not greater than the threshold. The threshold may be a fixed value that is preset or obtained by means of training, or may be a dynamic value that is constantly updated in a system. This is not limited. For example, comparing the steps for executing the second plan tree with the steps for executing the first plan tree in order to determine whether a quantity of different steps is not greater than one, or comparing the steps for executing the second plan tree with the steps for executing the first plan tree in order to determine whether a percentage of different steps is not greater than 99%. This is not limited. In the subsequent steps, any description refers to comparing the first plan tree and the second plan tree to determine whether the first plan tree is the same as or similar with the second plan tree has the same meaning as the description of step 104, and details are not described herein again. Generally, an obtained SQL execution plan is a sub-optimal execution plan when the threshold is not 0. However, it should be understood that more operation time and resources are saved in a process of determining the sub-optimal execution plan when compared with a process of determining an optimal execution plan. In some embodiments, for example, in an application scenario in which a requirement for the operation time and the resources is relatively high, the sub-optimal execution plan is used. Perform step 105 if the second plan tree established during the $N^{th}$ iteration is different from the first plan tree established during the $(N-1)^{th}$ iteration.

Step 105: Update the first iteration parameter using the second iteration parameter.

Further, a first eigenvalue and/or a second eigenvalue that are/is different from a first iteration parameter and that are/is in a second iteration parameter can be added to the first iteration parameter, that is, a union set of the first iteration parameter and the second iteration parameter is obtained, to obtain an updated first iteration parameter such that during an $(N+1)^{th}$ iteration, a second plan tree is re-established using the updated first iteration parameter. Because the updated first iteration parameter is a first eigenvalue and/or a second eigenvalue obtained when the second plan tree is actually executed, the second plan tree established using the updated first iteration parameter is more accurate.

Step 106: Update the first plan tree with the second plan tree, and increase a quantity of iterations by 1.

In this case, a second plan tree generated during this iteration process is used as a first plan tree during a next iteration process until a second plan tree established during an iteration process is the same as a first plan tree established during a previous iteration process.

In addition, a quantity of iterations may be increased by 1 in order to facilitate a repeated execution of steps 101 to 106. Perform step 107 if the second plan tree established during the $N^{th}$ iteration is the same as the first plan tree established during the $(N-1)^{th}$ iteration.

Step 107: Set the second plan tree as an SQL execution plan.

Further, in step 107, when the second plan tree established during the $N^{th}$ iteration is the same as the first plan tree established during the $(N-1)^{th}$ iteration, it indicates that after a quantity of N iterations, all first eigenvalues and second eigenvalues are included in the first iteration parameter. Therefore, in this case, the second plan tree established according to the first iteration parameter is optimal, and the second plan tree can be used as the SQL execution plan.

In this case, a correspondence between the second plan tree and a related SQL statement for executing the second plan tree can be saved. When the SQL statement is received again, the server can directly obtain the second plan tree, that is, the SQL execution plan from a corresponding storage unit.

In some embodiments, similar to step 104, step 107 further includes that if a second plan tree established during an $N^{th}$ iteration and a first plan tree established during an $(N-1)^{th}$ iteration are not greater than a threshold, the second plan tree or the first plan tree is used as an SQL execution plan. It should be understood that, in this embodiment, both the first plan tree and the second plan tree are sub-optimal plan trees, and either the first plan tree or the second plan tree can be selected as the SQL execution plan.

It should be understood that, in some embodiments or in some iteration cycles used as examples in some embodiments, step 103, step 105, and step 106 are optional steps.

In addition, optionally, an execution time of a second plan tree can be recorded in each iteration cycle. When a quantity of iterations exceeds a predetermined threshold, that is, when an iteration algorithm is not converged within a time threshold, the foregoing second plan tree with the shortest execution time in all iteration cycles is selected as the SQL execution plan.

Optionally, after the second plan tree is used as the SQL execution plan, a state of the SQL execution plan is set to a determined state in the server, that is, an optimized SQL execution plan is determined. In a subsequent step, when the state of the SQL execution plan is the determined state, a process during which the SQL execution plan is determined does not need to be repeated, thereby improving execution efficiency of the server.

Figure 2A:
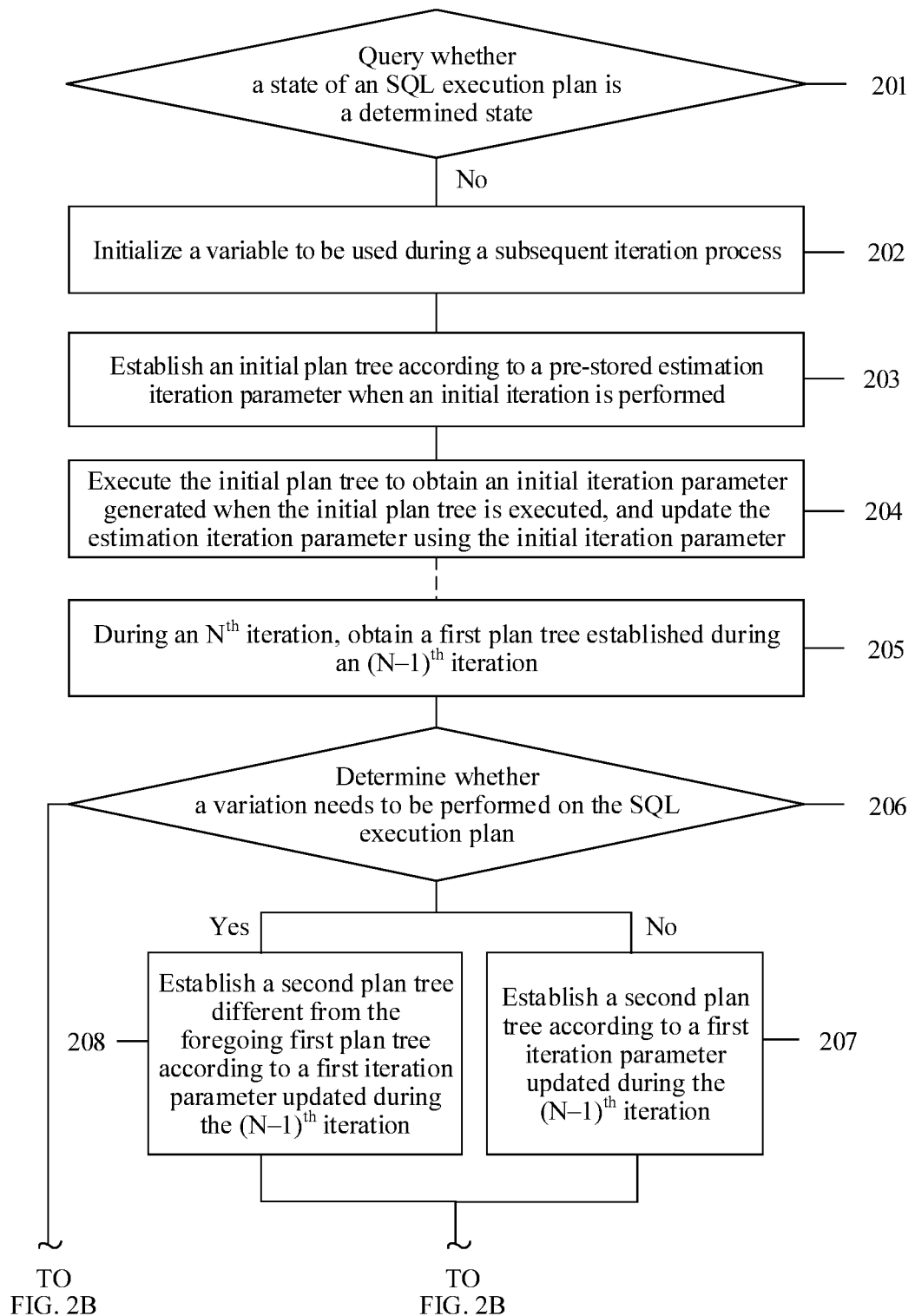
FIG. 2A and FIG. 2B are a schematic flowchart of another method for determining an SQL execution plan according to an embodiment of the present application.
Figure 2B:
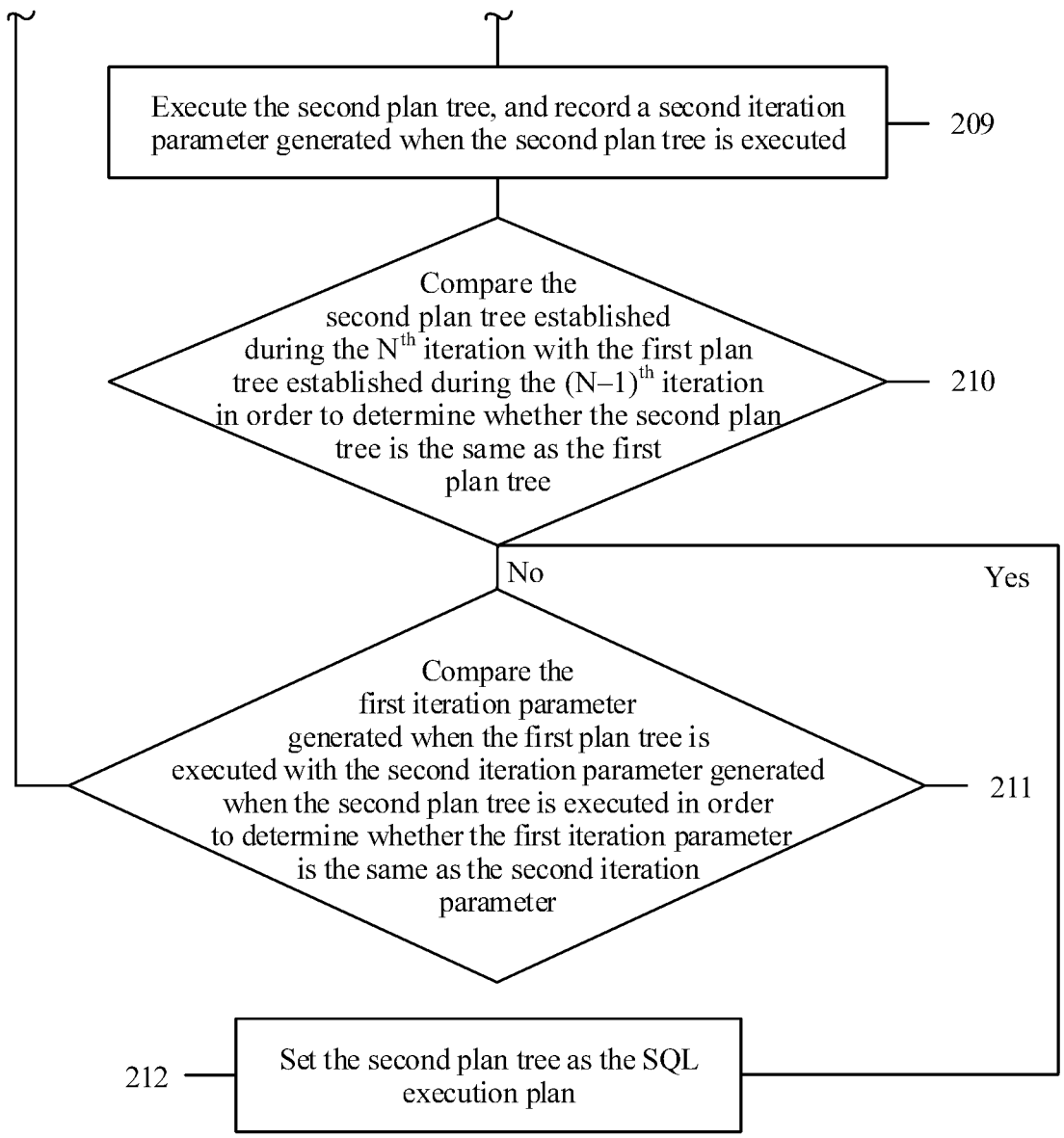

Further, based on the method for determining an SQL execution plan that is shown in FIG. 1, an embodiment of the present application further provides a method for determining an SQL execution plan. As shown in FIG. 2A and FIG. 2B, the method includes the following steps.

Step 201: Query whether a state of the SQL execution plan is a determined state.

Further, an identifier of a relation table corresponding to the SQL execution plan is carried in an SQL statement. For example, a received SQL statement includes select count(*) from dba, that is, search a relation table whose identifier is dba for a quantity of lines of a dba relation table.

Because a same SQL statement may be repeatedly executed by a server in a period of time, when an SQL execution plan related to an SQL statement is generated for the first time, a correspondence between the SQL execution plan and the SQL statement can be saved. In this way, when an SQL statement is received again, it can be found, by means of query, whether an SQL execution plan corresponding to the SQL statement exists, that is, whether a state of the SQL execution plan is a determined state.

For example, a variable Optimization can be set, and is used to indicate whether an SQL execution plan corresponding to a received SQL statement is stored.

In this case, the server can query whether the variable Optimization corresponding to the SQL statement is 1, and if Optimization=1, it indicates that an SQL execution plan corresponding to the received SQL statement is stored, and the server can directly obtain the SQL execution plan from a corresponding storage unit.

On the contrary, if Optimization≠1 that is, a state of the SQL execution plan is a non-determined state, it indicates that no SQL execution plan corresponding to the received SQL statement is stored, that is, the SQL statement is executed for the first time, and in this case, the following steps 202 to 213 are performed.

Step 202: If the SQL execution plan is in a non-determined state, initialize a variable to be used during a subsequent iteration process.

In step 202, if Optimization≠1 in this case, a variable to be used during an iteration can be initialized. For example, a quantity N of iterations is set to 1, the Optimization is set to 0, and a Variation is set to 0.

Step 203: Establish an initial plan tree according to a pre-stored estimation iteration parameter when an initial iteration is performed.

After the initialization operation in step 202 is completed, a first iteration process is started. In this case, an initial plan tree can be established according to an estimation iteration parameter stored in statistical information.

Because a plan tree is not established during the first iteration, an actual iteration parameter cannot be collected from a process during which a plan tree is executed. Therefore, in this case, the other approach is followed, that is, an initial plan tree $T_0$ is established using an estimation iteration parameter stored in the statistical information.

Step 204: Execute the initial plan tree to obtain an initial iteration parameter generated when the initial plan tree is executed, and update the estimation iteration parameter using the initial iteration parameter.

A difference from the other approach is that, in step 204, the server can execute the initial plan tree established in step 203, and an initial iteration parameter generated when the initial plan tree is executed is recorded, that is, $N_{(i)}$ and/or $N_{(i,j,k)}$. In this way, the estimation iteration parameter in step 203 can be updated with the initial iteration parameter generated when the initial plan tree is executed.

For example, it is assumed that the SQL statement in step 201 carries identifiers of two relation tables, that is, t1 and t2. In step 203, estimation iteration parameters for establishing an initial plan tree further include $N_{(t1)}$, $N_{(t2)}$, and $N_{(t2,t1)}$. However, in step 204, initial iteration parameters generated when an initial plan tree is executed may include $N_{(t1)}$, $N_{(t2)}$, and $N_{(t1,t2)}$. In this case, an iteration parameter that is in the initial iteration parameters and that is different from the estimation iteration parameters can be updated into the estimation iteration parameters, that is, the updated estimation iteration parameters are $N_{(t1)}$, $N_{(t2)}$, $N_{(t1,t2)}$, and $N_{(t2,t1)}$, and the updated estimation iteration parameters are used as the foregoing first iteration parameters in order to establish a second plan tree during a subsequent $(N-1)^{th}$ iteration process using the updated first iteration parameters.

Further, for the second to the last iteration processes, refer to the following steps 205 to 213. Further, an $N^{th}$ iteration process is used herein as an example for illustration purposes.

Step 205: During an $N^{th}$ iteration, obtain a first plan tree established during an $(N-1)^{th}$ iteration.

Because a plan tree established during each iteration process can be saved, during an $N^{th}$ iteration, a first plan tree established during an $(N-1)^{th}$ iteration can be obtained.

Step 206: Determine whether a variation needs to be performed on the SQL execution plan.

That is, whether the first iteration parameter is the same as the second iteration parameter is determined. A variation needs to be performed on the SQL execution plan if the first iteration parameter is the same as the second iteration parameter, or a variation does not need to be performed on the SQL execution plan if the first iteration parameter is different from the second iteration parameter. It should be understood that, in this step, N>1. N=2 is used herein as an example for description. After the first iteration process in steps 203 and 204, during a second iteration, it can be first determined whether a variation needs to be performed on an SQL execution plan, that is, whether a Variation is equal to 1.

If Variation≠1, step 207 is performed, or if Variation=1, step 208 is performed.

Step 207: If a variation does not need to be performed on the SQL execution plan, establish a second plan tree according to a first iteration parameter updated during the $(N-1)^{th}$ iteration.

Further, if the first iteration parameter generated when the first plan tree is executed is different from the second iteration parameter generated when the second plan tree is executed, the first iteration parameter is updated using the second iteration parameter. In the second iteration parameter, a first eigenvalue and/or a second eigenvalue that is different from the first iteration parameter can be added to the first iteration parameter, and an updated first iteration parameter is obtained, that is, a union set of the first iteration parameter and the second iteration parameter is obtained, and a result of the union set is used as an updated first iteration parameter.

That is, if Variation≠1, a variation does not need to be performed on the SQL execution plan, and a second plan tree is established according to the first iteration parameter updated during the $(N-1)^{th}$ iteration.

For example, when N=2, if Variation≠1, a second plan tree is established according to a first iteration parameter updated during a first iteration (that is, the first iteration parameter obtained in step 204).

Step 208: If a variation needs to be performed on the SQL execution plan, establish a second plan tree different from the foregoing first plan tree according to a first iteration parameter updated during the $(N-1)^{th}$ iteration.

Further, if Variation=1, that is, a variation needs to be performed on the SQL execution plan, a second plan tree can also be established according to a first iteration parameter updated during the $(N-1)^{th}$ iteration. However, a difference from step 207 is that the established second plan tree is different from a first plan tree established during the $(N-1)^{th}$ iteration.

For example, a plan tree established during a first iteration is an initial plan tree. Then, when N=3, if Variation=1, a second plan tree is established using a first iteration parameter updated during a second iteration, and it is ensured that the second plan tree is different from a first plan tree established during the second iteration.

It should be understood that, the server can establish a second plan tree according to a first iteration parameter. In this case, the second plan tree is considered by the server as an optimal plan tree that meets a requirement of the first iteration parameter, but may not be an actually optimal plan tree. When a variation needs to be performed on the SQL execution plan, the server can be prohibited from generating the foregoing second plan tree (that is, the second plan tree that is the same as the first plan tree) considered by the server as the optimal plan tree, but generate another second plan tree that is different from the first plan tree.

Step 209: Execute the second plan tree, and record a second iteration parameter generated when the second plan tree is executed.

Further, in step 209, the second plan tree established in step 207 or step 208 is executed, and a second iteration parameter generated when the second plan tree is executed is recorded.

Similarly, the second iteration parameter also includes $N_{(i)}$ and/or $N_{(i,j,k)}$.

Step 210: Compare the second plan tree established during the $N^{th}$ iteration with the first plan tree established during the $(N-1)^{th}$ iteration in order to determine whether the second plan tree is the same as the first plan tree.

It should be noted that, when N=2, a first plan tree established in the foregoing $(N-1)^{th}$ iteration, that is, during a first iteration, is the initial plan tree established in step 203.

Step 211: If the second plan tree established during the $N^{th}$ iteration is different from the first plan tree established during the $(N-1)^{th}$ iteration, compare the first iteration parameter generated when the first plan tree is executed with the second iteration parameter generated when the second plan tree is executed in order to determine whether the first iteration parameter is the same as the second iteration parameter, that is, to determine whether a variation needs to be performed on the SQL execution plan, step 206 is performed, and step 212 is performed only when the second plan tree established during the $N^{th}$ iteration is the same as the first plan tree established during the $(N-1)^{th}$ iteration.

Step 212: If the second plan tree established during the $N^{th}$ iteration is the same as the first plan tree established during the $(N-1)^{th}$ iteration, set the second plan tree as the SQL execution plan.

Further, in step 212, when the second plan tree established during the $N^{th}$ iteration is the same as the first plan tree established during the $(N-1)^{th}$ iteration, it indicates that after a quantity of N iterations, all first eigenvalues and second eigenvalues are included in the first iteration parameter. Therefore, in this case, the second plan tree established according to the first iteration parameter is optimal, and the second plan tree can be used as the SQL execution plan.

In addition, a correspondence between the second plan tree and the SQL statement is saved, and a variable Optimization is set to 1. In this way, when the SQL statement is received again, if Optimization=1, it indicates that an SQL execution plan corresponding to the received SQL statement is stored such that the server can directly obtain the SQL execution plan from a corresponding storage unit.

Figure 3A:
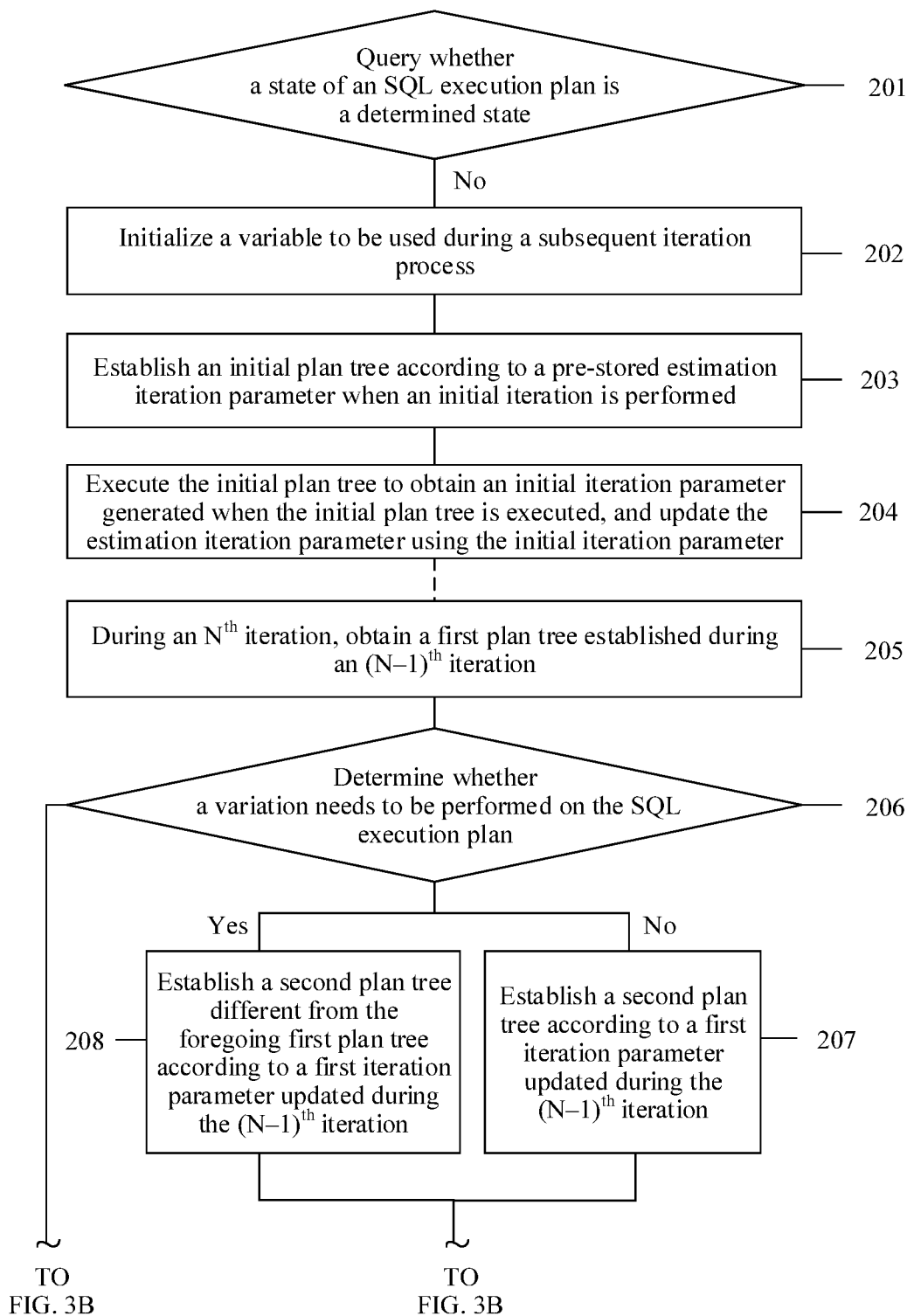
FIG. 3A and FIG. 3B are a schematic flowchart of another method for determining an SQL execution plan according to an embodiment of the present application.
Figure 3B:
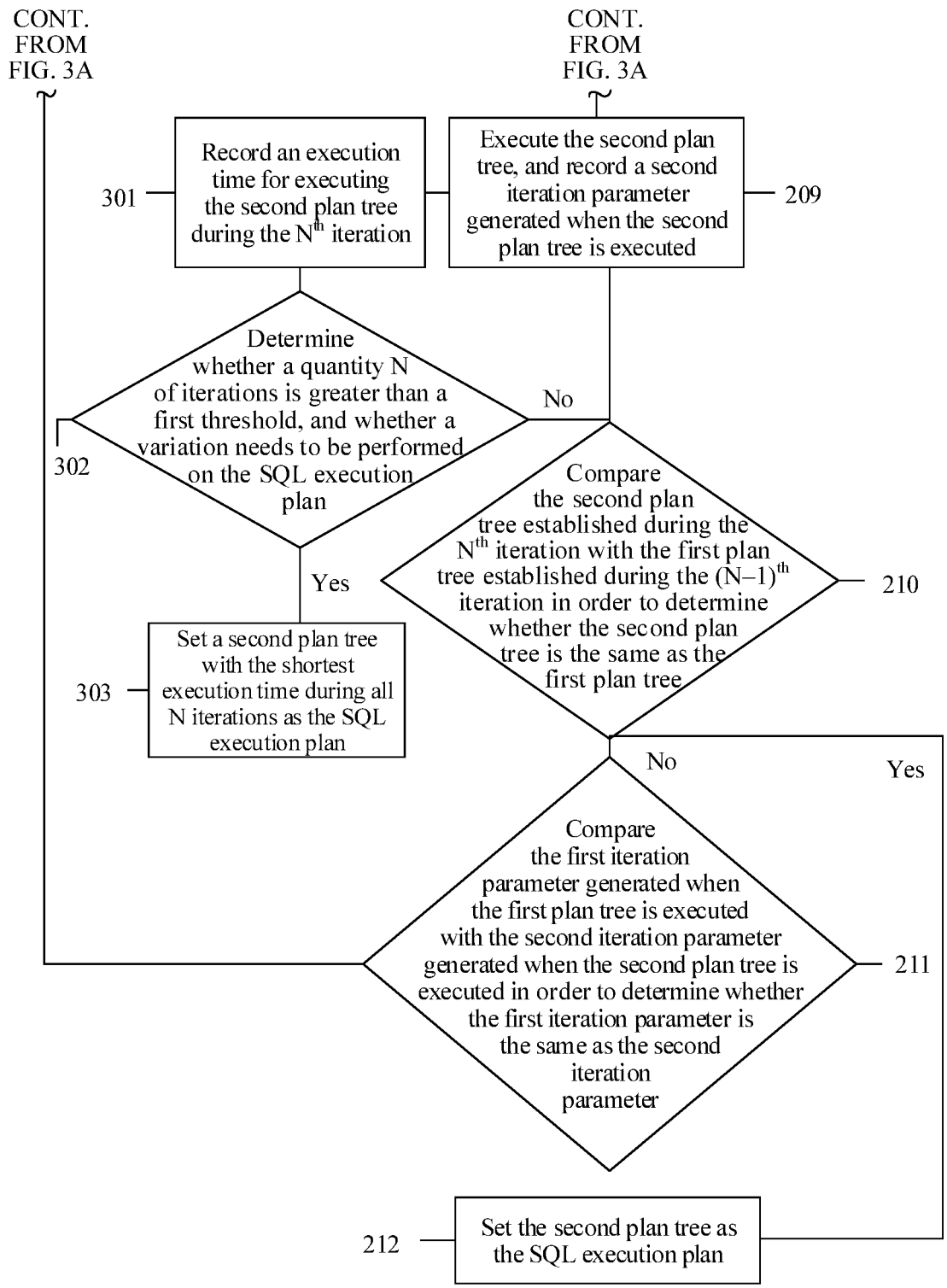

In addition, on a basis of steps 201 to 212, steps 301 to 303 can be further added. For example, as shown in FIG. 3A and FIG. 3B, steps 301 to 303 may be as follows.

Step 301: Record an execution time for executing the second plan tree during the $N^{th}$ iteration.

Step 302: Determine whether a quantity N of iterations is greater than a first threshold, and whether a variation needs to be performed on the SQL execution plan.

Step 303: If the quantity N of iterations is greater than the threshold, and a variation needs to be performed on the SQL execution plan, set a second plan tree with the shortest execution time during all N iterations as the SQL execution plan.

Further, in step 209, that is, when the second plan tree is executed, an execution time spent in executing the second plan tree can be recorded.

Further, after step 209 and before step 210, step 302 is performed, that is, whether a current quantity N of iterations is greater than the threshold and whether a variation needs to be performed on the SQL execution plan are determined.

Further, if the quantity N of iterations is greater than the threshold, and a variation needs to be performed on the SQL execution plan, that is, N is greater than the threshold, and Variation=1, step 303 is performed, that is, the second plan tree with the shortest execution time during the N iteration processes recorded in step 301 is used as the SQL execution plan in step 201.

In this way, for SQL execution plans on which a variation is already performed during iteration processes, a plan tree that is the same as a plan tree obtained during a previous iteration may never be obtained by means of iteration. Therefore, to avoid an infinite loop, it can be considered that when a quantity N of iterations is greater than a threshold, during passed N iteration processes, a second plan tree with the shortest execution time is an optimal plan tree, and then the second plan tree is used as the SQL execution plan.

Correspondingly, if it is determined, in step 302, that a current quantity N of iterations is less than the threshold, and/or a variation does not need to be performed on the SQL execution plan, in this case, an iteration is continually performed according to steps 210 to 212 until the quantity N of iterations is greater than the threshold and a variation does not need to be performed on the SQL execution plan.

In addition, when an execution time for executing the second plan tree during each iteration is recorded, for example, an execution time for executing the second plan tree during an $N^{th}$ iteration process is T1, in this case, an execution time T2 for executing the second plan tree during an $(N-1)^{th}$ iteration process can be compared with T1. If T1 is less than T2, the relatively short execution time T1, and a second plan tree corresponding to the relatively short execution time T1 are saved. In this way, the saved second plan tree is a second plan tree with the shortest execution time during $N^{th}$ iteration processes, and an execution time for executing the second plan tree during each iteration and a corresponding second plan tree do not need to be recorded, thereby saving storage resources.

This embodiment of the present application provides a method for determining an SQL execution plan. An $N^{th}$ iteration process is used as an example. First, a first iteration parameter updated during an $(N-1)^{th}$ iteration is obtained, for example, it is assumed that the first iteration parameter includes a first eigenvalue and/or a second eigenvalue, where the first eigenvalue is used to indicate a relation tuple of an $i^{th}$ relation table, and the second eigenvalue is used to indicate a relation tuple in a result set obtained after a join operation is performed on at least two relation tables. Then, a second plan tree is established using the first iteration parameter, and the second plan tree is used as the SQL execution plan when the second plan tree is the same as a first plan tree. A finally obtained second plan tree in the solution does not depend on an estimation iteration parameter already collected in a database, but is established according to a first iteration parameter updated during an iteration process. Further, the second plan tree is used as an SQL execution plan when a second plan tree is the same as a first plan tree such that a relatively accurate SQL execution plan can be determined, thereby improving execution efficiency of the SQL execution plan.

Figure 4:
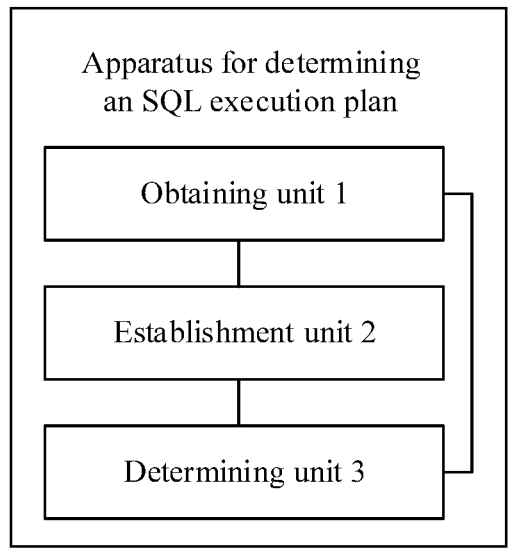
FIG. 4 is a schematic structural diagram of an apparatus for determining an SQL execution plan according to an embodiment of the present application.

FIG. 4 is a schematic structural diagram of an apparatus for determining an SQL execution plan according to an embodiment of the present application. The apparatus for determining an SQL execution plan that is provided in this embodiment of the present application can be used to implement methods that are implemented in the embodiments of the present application shown in FIG. 1 to FIG. 3B. For ease of description, only a part related to the embodiments of the present application is shown. For a detailed technical solution that is executed, refer to the embodiments of the present application shown in FIG. 1 to FIG. 3B. Details are not described again.

Further, as shown in FIG. 4, the apparatus for determining an SQL execution plan includes an obtaining unit 1, an establishment unit 2, and a determining unit 3. The apparatus is applied in an $N^{th}$ iteration, where the obtaining unit 1 is configured to obtain a first iteration parameter generated after a first plan tree is executed on the at least one relation table during an $(N-1)^{th}$ iteration, where N is a natural number greater than 1. The establishment unit 2 is configured to establish a second plan tree according to the first iteration parameter, and the determining unit 3 is configured to determine the first plan tree or the second plan tree as the SQL execution plan when a difference between the second plan tree and the first plan tree is not greater than a first threshold.

For example, the first threshold is 0, and correspondingly, determining the first plan tree or the second plan tree as the SQL execution plan when a difference between the second plan tree and the first plan tree is not greater than a first threshold includes determining the first plan tree or the second plan tree as the SQL execution plan when the second plan tree is the same as the first plan tree.

For example, the first iteration parameter includes relation tuples in any one or more relation tables corresponding to the SQL execution plan.

For example, when the SQL execution plan corresponds to at least two relation tables, the first iteration parameter further includes relation tuples in a result set that is obtained after a join operation is performed on any one or more relation tables in the at least two relation tables.

Figure 5:
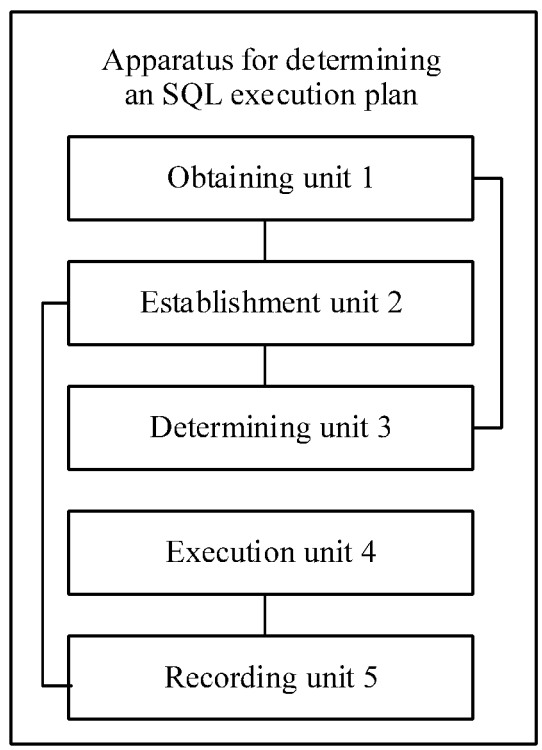
FIG. 5 is a schematic structural diagram of another apparatus for determining an SQL execution plan according to an embodiment of the present application.

Further, as shown in FIG. 5, the apparatus further includes an execution unit 4 configured to execute the second plan tree, and a recording unit 5 configured to record a second iteration parameter generated when the second plan tree is executed.

For example, the recording unit 5 is further configured to record a state of the SQL execution plan as a determined state.

For example, the second iteration parameter includes relation tuples in any one or more relation tables corresponding to the SQL execution plan.

For example, when the SQL execution plan corresponds to at least two relation tables, the second iteration parameter further includes relation tuples in a result set that is obtained after a join operation is performed on any one or more relation tables in the at least two relation tables.

Figure 6:
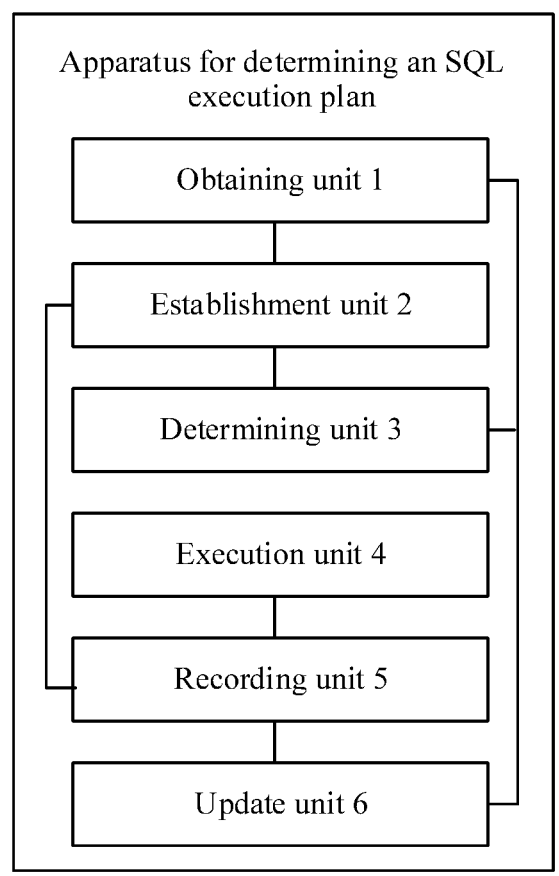
FIG. 6 is a schematic structural diagram of another apparatus for determining an SQL execution plan according to an embodiment of the present application.

Further, as shown in FIG. 6, the apparatus further includes an update unit 6 configured to update the first iteration parameter according to the second iteration parameter when the difference between the second plan tree and the first plan tree is greater than the first threshold, and set the second plan tree during the $N^{th}$ iteration as a first plan tree during an $(N+1)^{th}$ iteration.

The establishment unit 2 is further configured to establish a second plan tree different from the first plan tree according to the first iteration parameter when the second iteration parameter is the same as the first iteration parameter.

The recording unit 5 is further configured to record an execution time for executing the second plan tree.

The determining unit 3 is further configured to set the second plan tree with the shortest execution time during all N iterations as the SQL execution plan when the quantity N of iterations is greater than a second threshold.

The determining unit 3 is further configured to set the second plan tree with the shortest execution time during all N iterations as the SQL execution plan when the quantity N of iterations is greater than a third threshold.

The recording unit 5 is further configured to record a state of the SQL execution plan as a determined state.

The establishment unit 2 is further configured to establish an initial plan tree according to a pre-stored estimation iteration parameter when an initial iteration is performed.

The execution unit 4 is further configured to execute the initial plan tree to obtain an initial iteration parameter generated when the initial plan tree is executed.

The update unit 6 is further configured to update the estimation iteration parameter using the initial iteration parameter to obtain the first iteration parameter.

Figure 7:
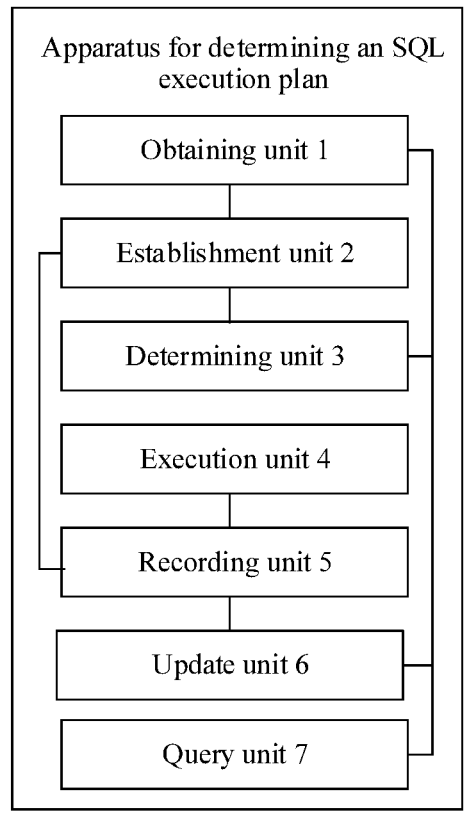
FIG. 7 is a schematic structural diagram of another apparatus for determining an SQL execution plan according to an embodiment of the present application.

Further, as shown in FIG. 7, the apparatus further includes a query unit 7.

The query unit 7 is configured to query whether the state of the SQL execution plan is the determined state.

The determining unit 3 is further configured to execute the SQL execution plan when the state of the SQL execution plan is the determined state.

The update unit 6 is further configured to obtain a union set of the second iteration parameter and the first iteration parameter, and set a result of the union set as the first iteration parameter.

Figure 8:
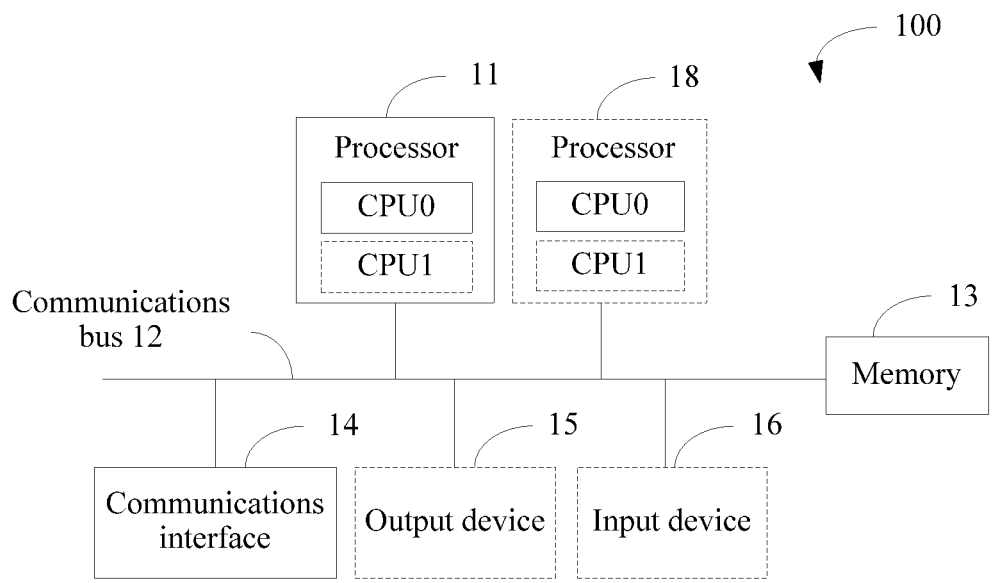
FIG. 8 is a schematic structural diagram of a computer device according to an embodiment of the present application.

As shown in FIG. 8, the apparatus for determining an SQL execution plan shown in FIG. 4 to FIG. 7 can be obtained using a computer device (or a computer system) in FIG. 8.

FIG. 8 is a schematic diagram of a computer device 100 according to an embodiment of the present application. The computer device 100 includes at least one processor 11, a communications bus 12, a memory 13, and at least one communications interface 14.

The memory 13 is configured to store a computer execution instruction. The processor 11 is connected to the memory 13 using the communications bus 12. When an apparatus for determining an SQL execution plan runs, the processor 11 executes the computer execution instruction stored in the memory 13 such that the apparatus for determining an SQL execution plan performs the method for determining an SQL execution plan in any one of FIG. 1 to FIG. 3B.

Specific functions of the foregoing obtaining unit 1, the establishment unit 2, the determining unit 3, the execution unit 4, the recording unit 5, the update unit 6, and the query unit 7 of FIGS. 4 to 7 can be implemented by the processor 11 in the computer device 100 by invoking the computer execution instruction stored in the memory 13.

The processor 11 may be a general central processing unit (CPU), a microprocessor, an application-specific integrated circuit (ASIC), or one or more integrated circuits that are configured to control program execution of the solutions of the present application.

The communications bus 12 may include a path for transferring information between the foregoing components. The communications interface 14 is configured to communicate with another device or communications network, such as an Ethernet, a radio access network (RAN), or a wireless local area network (WLAN) using any apparatus of a transceiver type.

The memory 13 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM), another compact disc storage device, an optical disc storage device (such as a compact disc, a laser disc, an optical disc, a digital versatile disc, or a BLU-RAY DISC), a disk storage medium, another disk storage device, or any other medium that can be used to carry or store expected program code in form of an instruction or a data structure and that can be accessed by a computer. This is not limited herein. The memory 13 may exist independently, and is connected to the processor using the bus. The memory 13 may also be integrated into the processor.

The memory 13 is configured to store the application program code that is used to execute the solutions of the present application, and the application program code is executed under the control of the processor 11. The processor 11 is configured to execute the application program code stored in the memory 13.

In a specific implementation, in an embodiment, the processor 11 may include one or more CPUs, such as a CPU0 and a CPU1 in FIG. 8.

In a specific implementation, in an embodiment, the computer device 100 may include multiple processors, for example, the processor 11 and a processor 18 in FIG. 8. Each of the processors may be a single-core (single-CPU) processor, or may be a multi-core (multi-CPU) processor. The processors 11 and 18 herein may refer to one or more devices, circuits, and/or processing cores used to process data (for example, a computer program instruction).

In a specific implementation, in an embodiment, the computer device 100 may further include an output device 15 and an input device 16. The output device 15 communicates with the processor 11, and can display information in multiple manners. For example, the output device 15 may be a liquid crystal display (LCD), a light emitting diode (LED) display device, a cathode-ray tube (CRT) display device, or a projector. The input device 16 communicates with the processor 11, and can receive an input from a user in multiple manners. For example, the input device 16 may be a mouse, a keyboard, a touchscreen device, or a sensor device.

The foregoing computer device 100 may be a general-purpose computer device or a special-purpose computer device. In a specific implementation, the computer device 100 may be a desktop computer, a portable computer, a network server, a personal digital assistant (PDA), a mobile phone, a tablet computer, a wireless terminal device, a communications device, a built-in device, or a device with a structure similar to that in FIG. 8. This embodiment of the present application does not impose limitation on a type of the computer device 100.

This embodiment of the present application provides a method for determining an SQL execution plan. An $N^{th}$ iteration process is used as an example. First, a first iteration parameter updated during an $(N-1)^{th}$ iteration is obtained, for example, the first iteration parameter includes a first eigenvalue and/or a second eigenvalue, where the first eigenvalue is used to indicate a relation tuple of an $i^{th}$ relation table, and the second eigenvalue indicates a relation tuple in a result set obtained after a join operation is performed on at least two relation tables. Then, a second plan tree is established using the first iteration parameter, and the second plan tree is used as the SQL execution plan when the second plan tree is the same as a first plan tree. A finally obtained second plan tree in the solution does not depend on an estimation iteration parameter already collected in a database, but is established according to a first iteration parameter updated during an iteration process. Further, the second plan tree is used as an SQL execution plan when a second plan tree is the same as a first plan tree such that a relatively accurate SQL execution plan can be determined, thereby improving execution efficiency of the SQL execution plan.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication joins may be implemented using some interfaces. The indirect couplings or communication joins between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A structured query language (SQL) statement performing apparatus for determining a SQL execution plan, wherein the SQL execution plan corresponds to at least one relation table and a SQL statement, and wherein the SQL statement performing apparatus comprises:
   a memory configured to store instructions and data; and
   a processor coupled to the memory, wherein during an $N^{th}$ iteration, the instructions cause the processor to be configured to:
      obtain a first iteration parameter generated after a first plan tree is executed for the SQL statement on the at least one relation table during an $(N-1)^{th}$ iteration, wherein the first iteration parameter comprises first relation tuples in any one or more of the at least one relation table corresponding to the SQL execution plan, and wherein N is a natural number greater than 1;
      establish a second plan tree for the same SQL statement according to the first iteration parameter;
      execute the second plan tree to generate a second iteration parameter, wherein the second iteration parameter comprises second relation tuples in any one or more of the at least one relation table corresponding to the SQL execution plan;
      record the second iteration parameter into the memory;
      determine the second plan tree as the SQL execution plan and perform the SQL statement based on the determined SQL execution plan when a difference between the second plan tree and the first plan tree is not greater than a first predetermined threshold;
      establish the second plan tree different from the first plan tree according to the first iteration parameter by prohibiting generation of the second plan tree that is the same as the first plan tree when the second iteration parameter is the same as the first iteration parameter;

update the first iteration parameter according to the second iteration parameter when a difference between the second plan tree and the first plan tree is greater than the first predetermined threshold; and set the second plan tree during the $N^{th}$ iteration as a first plan tree during an $(N+1)^{th}$ iteration based on the updated first iteration parameter.

2. The SQL statement performing apparatus of claim 1, wherein the first predetermined threshold is 0.

3. The SQL statement performing apparatus of claim 1, wherein the SQL execution plan corresponds to at least two relation tables, and wherein the first iteration parameter further comprises relation tuples in a result set obtained after a join operation is performed on any one or more relation tables in the at least two relation tables.

4. The SQL statement performing apparatus of claim 1, wherein after determining the first plan tree as the SQL execution plan, the instructions further cause the processor to be configured to record a state of the SQL execution plan as a determined state into the memory.

5. The SQL statement performing apparatus of claim 1, wherein the SQL execution plan corresponds to at least two relation tables, and wherein the second iteration parameter further comprises relation tuples in a result set obtained after a join operation is performed on any one or more relation tables in the at least two relation tables.

6. The SQL statement performing apparatus of claim 1, wherein the instructions further cause the processor to be configured to:

record an execution time for executing the second plan tree into the memory; and set the second plan tree with shortest execution time during a plurality of N iterations as the SQL execution plan when N is greater than a second predetermined threshold.

7. The SQL statement performing apparatus of claim 6, wherein after setting the second plan tree with the shortest execution time during the plurality of N iterations as the SQL execution plan, the instructions further cause the processor to be configured to record a state of the SQL execution plan as a determined state into the memory.

8. The SQL statement performing apparatus of claim 1, wherein before updating the first iteration parameter, the instructions further cause the processor to be configured to:

record an execution time for executing the second plan tree into the memory; and set the second plan tree with shortest execution time during a plurality of N iterations as the SQL execution plan when N is greater than a third predetermined threshold.

9. The SQL statement performing apparatus of claim 8, wherein after setting the second plan tree with the shortest execution time during the plurality of N iterations as the SQL execution plan, the instructions further cause the processor to be configured to record a state of the SQL execution plan as a determined state into the memory.

10. The SQL statement performing apparatus of claim 1, wherein the instructions further cause the processor to be configured to:

obtain a union set of the second iteration parameter and the first iteration parameter; and set a result of the union set as the first iteration parameter.

11. The SQL statement performing apparatus of claim 1, wherein the instructions further cause the processor to be configured to:

establish an initial plan tree according to a pre-stored estimation iteration parameter when an initial iteration is performed;

execute the initial plan tree to obtain an initial iteration parameter; and update the estimation iteration parameter according to the initial iteration parameter to obtain the first iteration parameter.

12. The SQL statement performing apparatus of claim 11, wherein the SQL execution plan corresponds to at least two relation tables, and wherein the initial iteration parameter further comprises relation tuples in a result set obtained after a join operation is performed on any one or more relation tables in the at least two relation tables.

13. The SQL statement performing apparatus of claim 11, wherein the instructions further cause the processor to be configured to:

obtain a union set of the initial iteration parameter and the estimation iteration parameter; and set a result of the union set as the first iteration parameter.

14. The SQL statement performing apparatus of claim 11, wherein before the initial iteration is performed, the instructions further cause the processor to be configured to:

query whether a state of the SQL execution plan is a determined state; and execute the SQL execution plan when the state of the SQL execution plan is the determined state.

15. The SQL statement performing apparatus of claim 1, wherein the second plan tree is established based on the first iteration parameter updated by executing the first plan tree, and wherein the second plan tree does not depend on an estimation iteration parameter previously collected in a database to improve execution efficiency of the SQL execution plan.

16. The SQL statement performing apparatus of claim 1, wherein the second plan tree is set as the SQL execution plan when the second plan tree is the same as the first plan tree such that an accurate SQL execution plan is determined to improve execution efficiency of the SQL execution plan.

17. The SQL statement performing apparatus of claim 1, wherein the SQL statement performing apparatus comprises a computing system, wherein the memory comprises a non-transitory computer readable medium, wherein the processor comprises a computer microprocessor, and wherein the SQL execution plan is executed by querying the at least one relation table.

18. A method for determining a structured query language (SQL) execution plan, wherein the SQL execution plan corresponds to at least one relation table, and wherein during an $N^{th}$ iteration, the method comprises:

obtaining a first iteration parameter generated after a first plan tree is executed for the SQL statement on the at least one relation table during an $(N-1)^{th}$ iteration, wherein the first iteration parameter comprises first relation tuples in the at least one relation table corresponding to the SQL execution plan, and wherein N is a natural number greater than 1;

establishing a second plan tree for the same SQL statement according to the first iteration parameter;

executing the second plan tree to generate a second iteration parameter, wherein the second iteration parameter comprises second relation tuples in any one or more of the at least one relation table corresponding to the SQL execution plan;

recording the second iteration parameter into the memory;

determining the second plan tree as the SQL execution plan and perform the SQL statement based on the determined SQL execution plan when a difference between the second plan tree and the first plan tree is not greater than a first predetermined threshold;

establishing the second plan tree different from the first plan tree according to the first iteration parameter by prohibiting generation of the second plan tree that is the same as the first plan tree when the second iteration parameter is the same as the first iteration parameter;

updating the first iteration parameter according to the second iteration parameter when a difference between the second plan tree and the first plan tree is greater than the first predetermined threshold; and setting the second plan tree during the Nth iteration as a first plan tree during an $(N+1)^{th}$ iteration based on the updated first iteration parameter.

19. The method of claim 18, wherein the first predetermined threshold is 0.

* * * * *